United States Patent [19]

Rawlins

[11] 3,753,073

[45] Aug. 14, 1973

[54] SIGNAL INTERPRETING CIRCUIT

[76] Inventor: Wendell G. Rawlins, 913 Croix St., Topeka, Kans. 66611

[22] Filed: Jan. 20, 1972

[21] Appl. No.: 219,399

[52] U.S. Cl. ...................... 321/6, 246/115, 317/147, 340/38 L

[51] Int. Cl. ........................................... H02m 7/00

[58] Field of Search ...................... 246/40, 115, 249; 317/147; 321/6; 340/38 L; 307/261; 331/112

[56] References Cited

UNITED STATES PATENTS

| | | | |
|---|---|---|---|
| 3,549,954 | 12/1970 | Bourgeault et al. | 317/147 |
| 3,671,773 | 6/1972 | Cardwell, Jr. | 307/261 |
| 3,568,038 | 3/1971 | Enders et al. | 331/112 X |
| 3,543,100 | 11/1970 | Gith | 317/147 X |

*Primary Examiner*—William M. Shoop, Jr.
*Attorney*—Clelle W. Upchurch

[57] ABSTRACT

A signal interpreting circuit for switching an output load in response to an increasing input frequency, the circuit having a frequency to direct current converter for providing a direct current voltage varying inversely with input frequency, a load controlling circuit for continuously energizing the load as long as the direct current voltage remains the same or increases, and a capacitor-transistor circuit responsive to a decreasing of the direct current voltage for interrupting the continuously energized load.

12 Claims, 1 Drawing Figure

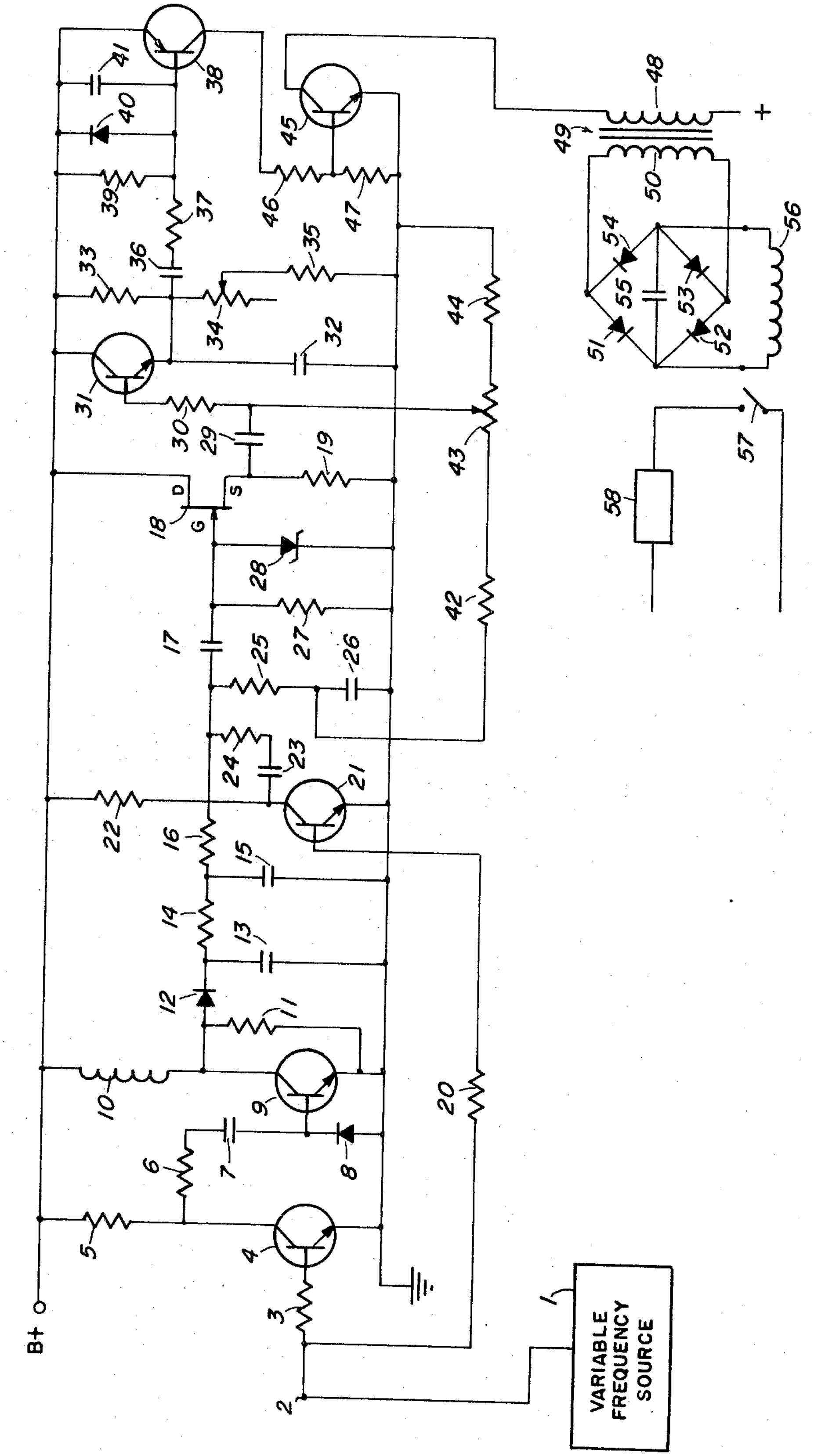
B+
+
D
S
G
VARIABLE FREQUENCY SOURCE

SIGNAL INTERPRETING CIRCUIT

This invention relates to a control circuit for continuously energizing a load except upon the occurrence of a specified event. The specified event may, in general, be a change in the frequency of the input signal supplied to the control circuit or, in the preferred embodiment of this invention, it may be the approach of a train near a railroad crossing which results in the frequency change.

The control circuit operates to provide a signal at the crossing when a train is moving toward that crossing. If the train is stationary within the segment of track forming the detection segment, no signal will result; and, if the train is moving away from the crossing, no signal will result.

The manner in which the detecting segment is formed and the oscillator circuit for providing an output signal the frequency of which varies as the train traverses this segment are disclosed in my copending application Ser. No. 162,201 filed July 13, 1971, the disclosure of which is incorporated herein by reference.

An additional feature of this invention is that the circuit is fail safe. If any of the components fail, or if the supply voltage exceeds or falls below a predetermined value, the crossing signal will be energized.

Additional features of this invention will become apparent from the following detailed description taken in connection with the accompanying drawing which shows an embodiment of the control circuit of the instant invention.

The output signal from a variable frequency source 1, such as that described in my above mentioned copending application; is connected to terminal 2. Terminal 2 is connected through resistor 3 to the base of NPN transistor 4. The emitter of transistor 4 is connected directly to ground whereas its collector is connected to B+ through resistor 5. This collector is also connected through resistor 6, capacitor 7 and diode 8 to ground. Transistor 4 serves to clip and amplify the signal applied to its base.

The junction of capacitor 7 and diode 8 is connected to the base of NPN transistor 9. The collector of transistor 9 is connected to one end of inductor 10, and the other end of which is connected to emitter of transistor 4 is connected B+. The emitter of transistor 9 is connected to ground. Transistor 9 has its collector and emitter connected together by resistor 11. Diode 12 connects the collector of transistor 9 to one side of capacitor 13, the other side of which is grounded. Resistor 14 joins the junction of diode 12 and capacitor 13 to one end of capacitor 15, the other end of which is connected to ground.

Transistor 9, inductor 10, diode 12 and capacitors 13 and 15 act as a frequency to direct current converter. As the signal at terminal 2 swings in a negative direction, transistor 4 turns off causing transistor 9 to conduct. During the conduction of transistor 9, inductor 10 stores energy. When the base of transistor 4 swings in a positive direction, transistor 4 conducts and transistor 9 ceases conduction, causing inductor 10 to release its stored energy. This released energy flows through diode 12 to charge capacitor 15.

Since the amount of energy released by inductor 10 depends upon the length of time transistor 9 conducts, this energy will decrease due to an increasing switching frequency of transistor 9. Thus, the voltage acquired by capacitor 15 varies inversely with the frequency of the signal at terminal 2.

The voltage established by capacitor 15 is connected through resistor 16 to one side of capacitor 17. The other side of capacitor 17 is connected to the gate of junction Field Effect Transistor (FET) 18. The drain terminal of FET 18 is connected to B+ whereas the source terminal is connected through resistor 19 to ground.

The input signal applied to terminal 2 is also fed through resistor 20 to the base of NPN transistor 21. The collector of transistor 21 is connected through resistor 22 to B+ and also through capacitor 23 and resistor 24 to the junction of resistor 16 and capacitor 17. Thus, the alternating current signal which was converted to a direct current voltage across capacitor 15 is reapplied through transistor 21 to capacitor 17. Capacitor 17, under steady state conditions, serves to block out the direct current voltage of capacitor 15, and to pass the alternating current signal supplied by transistor 21.

The junction of resistor 16 and capacitor 17 is connected to ground through the series circuit of resistor 25 and capacitor 26. Moreover, the junction of capacitor 17 and the gate of FET 18 is connected to ground through the parallel circuit of resistor 27 and zener diode 28.

The signal established by resistor 19 is applied through capacitor 29 and resistor 30 to the base of NPN transistor 31. The collector of transistor 31 is connected to B+, and the emitter is grounded through capacitor 32.

The emitter of transistor 31 is also connected to B+ through resistor 33 and to ground through potentiometer 34 and resistor 35. Finally, this emitter is connected through capacitor 36 and resistor 37 to the base of PNP transistor 38. The base of transistor 38 is connected to B+ through the parallel combination of thermistor 39, diode 40 and capacitor 41.

Transistor 31, as will be hereinafter disclosed, acts as both an undervoltage and overvoltage detector, and transistor 38 acts as a level detector.

The junction of resistor 25 and capacitor 26 is connected to ground through resistor 42, potentiometer 43 and resistor 44. The movable arm of potentiometer 43 is connected to the base of transistor 31 through resistor 30.

The collector of transistor 38 is connected to the base of NPN transistor 45 through resistor 46. The base of transistor 45 is connected to ground through resistor 47, whereas the emmitter of transistor 45 is directly grounded. The collector of transistor 45 is connected through primary 48 of transformer 49 to a source of positive potential. The secondary winding 50 is connected across the input terminals of a full wave rectifier comprising diodes 51–54. The output terminals of the full wave rectifier are connected to the parallel combination of capacitor 55 and relay coil 56.

Switch 57, controlled by relay 56, serves to disconnect signalling system 58 from a source of power whenever the relay coil is energized.

In operation, with no train entering into or on the detecting section of track, the output frequency from source 1 is at its normal minimum level, and, therefore, the direct current voltage across capacitor 15 is at its normal maximum value. Capacitor 17 blocks out this voltage but passes the alternating current supplied by transistor 21. This alternating current is applied through FET 18, amplified by transistors 31 and 38, and supplied to the base of transistor 45. This alternating current on the base of transistor 45 causes primary winding 48 to be supplied with an alternating voltage which appears across secondary 50 to charge capacitor 55. The charge on capacitor 55 maintains relay coil 56 energized, switch 57 open and signal 58 deenergized.

Therefore, as long as alternating current flows through the circuit, the signal 58 will not be activated.

Upon a train entering the detecting section of track, the frequency from source 1 begins to increase and the direct current voltage across capacitor 15 begins to decrease. This decrease pulls down the voltage on the left side electrode of capacitor 17 which causes the right side electrode, which oscillated around ground potential, to go negative. This decrease results in an average negative potential being applied to the gate of FET 18, preventing the alternating current from passing there through. The cessation of the alternating current turns off transistors 31, 38, and 45, deenergizing transformer 49. Capacitor 55 discharges and when its voltage falls sufficiently, relay 56–57 drops out and signalling system 58 is energized.

If the train stops within the detecting segment of track, the voltage across capacitor 15 no longer decreases. The right side electrode of capacitor 17 goes back up to ground potential and alternating current is again passed through the circuit to deenergize signalling system 58.

Once the train passes the crossing, the frequency of source 1 begins to decrease causing the voltage across capacitor 15 to increase. This increasing voltage causes the right side electrode of capacitor 17 to go positive passing the alternating current through the circuit to deenergize signalling system 58.

Thus only when a train approaches the crossing will the alternating current be interrupted to deenergize the signalling system.

The circuit is completely fail safe insofar as the failure of any component of the circuit results in the interruption of the alternating current signal and energization of the signals.

If the voltage across capacitor 15 becomes too large for any reason, the voltage on the movable arm of potentiometer 43 becomes large enough to saturate transistor 31 and prevent the alternating current from being conducted therethrough. On the other hand, if this voltage is below the minimum value established by potentiometer 34, transistor 31 will pass the alternating current resulting in energization of signalling system 58.

This invention has been described by way of illustration rather than limitation and it should be apparent that the invention is equally applicable in fields other than those described.

What is claimed is:

1. A fail safe control system having a frequency to direct current converter comprising: source means for providing a variable frequency input signal; converter means for establishing a direct current voltage dependent upon the frequency of said input signal; load means; and, signal supply means connected to said source means for providing a continuous output signal to said load means, including means responsive to a decrease in said direct current voltage for interrupting said continuous signal.

2. The control system of claim 1 wherein said load means comprises: a relay coil for receiving said continuous signal; a switch normally held open in response to said relay coil receiving said continuous signal; and indicating signal means for providing a warning when said switch closes.

3. The control system of claim 1 wherein said converter means comprises: switch means, having conductive and nonconductive states, responsive to said input signal; inductor means connected between said switch means and source means for storing energy while said switch means is conductive and for releasing said energy while said switch means is nonconductive; a diode connected to said inductor means; and a capacitor which is charged from said inductor means through said diode thereby providing said direct current voltage.

4. The control system of claim 1 wherein said responsive means comprises: amplifying means having an input and an output; capacitor means connected between said converter means and said input, said capacitor means and said converter means having a junction; and means for connecting said output to said load means.

5. The control system of claim 4 wherein said signal supply means further includes switch means having an input terminal connected to said source means and an output terminal connected to said junction for supplying an alternating signal to the base of said amplifying means, said alternating signal being interrupted upon a decreasing of said direct current voltage.

6. The control system of claim 5 wherein said load means comprises relay means for receiving said continuous signal , and an indicating signal means, connected to said relay means, for providing a warning signal when said continuous signal is interrupted.

7. The control system of claim 4 wherein said amplifying means for interrupting said continuous signal in response to overvoltage of said direct current voltage.

8. The control system of claim 7 wherein said amplifying means comprises means for interrupting said continuous signal in response to undervoltage of said direct current voltage.

9. The control system of claim 8 wherein said signal supply means further includes switch means having an input terminal connected to said source means and an output terminal connected to said junction for supplying an alternating signal to the base of said amplifying means, said alternating signal being interrupted upon a decreasing of said direct current voltage.

10. The control system of claim 9 wherein said load means comprises relay means for receiving said continuous signal , and an indicating signal means, connected to said relay means, for providing a warning signal when said continuous signal is interrupted.

11. the control system of claim 10 wherein said converter means comprises: switch means, having conductive and nonconductive states, responsive to said input signal; inductor means connected between said switch means and source means for storing energy while said switch means is conductive and for releasing said energy while said switch means is conductive; a diode connected to said inductor means; and a capacitor which is charged from said inductor means through said diode thereby providing said direct current voltage.

12. A fail safe control system for providing a warning signal at a railroad crossing when a train is moving towards that crossing, comprising:

a. source means for providing a variable frequency input signal;

b. converter means for establishing a direct current voltage dependent upon the frequency of said input signal, said converter means including switch means having conductive and nonconductive states, responsive to said input signal, inductor means connected to said switch means for storing energy while said switch means is conductive and for releasing said energy while said switch means is nonconductive, a diode connected to said inductor means, and a capacitor which is charged from said inductor means through said diode;

c. load means including a relay coil for receiving a continuous signal, a switch normally held open in response to said relay coil receiving said continuous signal, and indicating signal means for providing a warning when said switch closes; and d. signal supply means, connected to said source means, for supplying said continuous signal to said load means, said signal supply means including first means responsive to a decrease in said direct current voltage for interrupting said continuous signal, said first interrupting means including amplifying means having an input and an output, capacitor means connected between said converter means and said input, and means for connecting said output to said load means, said amplifier means further including second means for interrupting said continuous signal in response to overvoltage of said direct current voltage and third means for interrupting said continuous signal in response to undervoltage of said direct current voltage.

* * * * *